United States Patent [19]

Comer

[11] 4,335,567
[45] Jun. 22, 1982

[54] BAGGING FILAMENT MOWER

[75] Inventor: Robert C. Comer, Hopkins, Minn.

[73] Assignee: The Toro Company, Minneapolis, Minn.

[21] Appl. No.: 182,986

[22] Filed: Sep. 2, 1980

[51] Int. Cl.³ .................. A01D 50/00; A01D 55/18
[52] U.S. Cl. ................................. 56/12.7; 56/13.4
[58] Field of Search .............. 56/12.7, 320.1, 320.2, 56/13.4, 202, 295, 13.6

[56] References Cited

U.S. PATENT DOCUMENTS

| B. 494,167 | 3/1976 | Comer | 56/13.4 |
| 2,815,634 | 12/1957 | Bush | 56/13.6 |
| 2,929,186 | 3/1960 | Bundy | 56/320.2 |
| 2,953,888 | 9/1960 | Phillips, Jr. et al. | 56/13.4 |
| 3,157,014 | 11/1964 | Bottenberg | 56/320.2 |
| 3,717,985 | 2/1973 | Freedlander et al. | 56/295 |
| 3,777,461 | 12/1973 | Giraud | 56/202 |
| 3,905,181 | 9/1975 | Messner | 56/13.4 |
| 4,030,273 | 6/1977 | Leader | 56/13.4 |
| 4,065,913 | 1/1978 | Fisher | 56/12.7 |
| 4,176,508 | 12/1979 | Baumann et al. | 56/12.7 |
| 4,189,905 | 2/1980 | Frantello | 56/12.7 |
| 4,232,505 | 11/1980 | Waldo | 56/12.7 |

FOREIGN PATENT DOCUMENTS 223820  8/1959  Australia .................. 56/13.4

Primary Examiner—Paul J. Hirsch
Attorney, Agent, or Firm—James W. Miller

[57] ABSTRACT

Lawn mower (2) includes a housing (4) having at least one cutting chamber (22 or 24) in which a flexible line cutting element (8) is rotated by a motor (76). Sails (80) located on cutting element (8) are configured to generate an air flow in the cutting chamber (20 or 22). This air flow is directed to a discharge outlet (38) in the housing (4) which causes the cut grass particles to be deposited in a grass collector (14). Grass collector (14) includes air discharge outlets (94) which evacuate the air flow from the grass collector (14) to ensure proper deposition of the grass particles therein. Sails (80) are preferably flexible so as to be incapable of severing a body member accidentally placed into contact therewith. An improved sail (240) radially outboard of a support disc (224) overlies flexible lines (226 and 228) to give better agitation of the vegetation in yet another embodiment.

10 Claims, 17 Drawing Figures

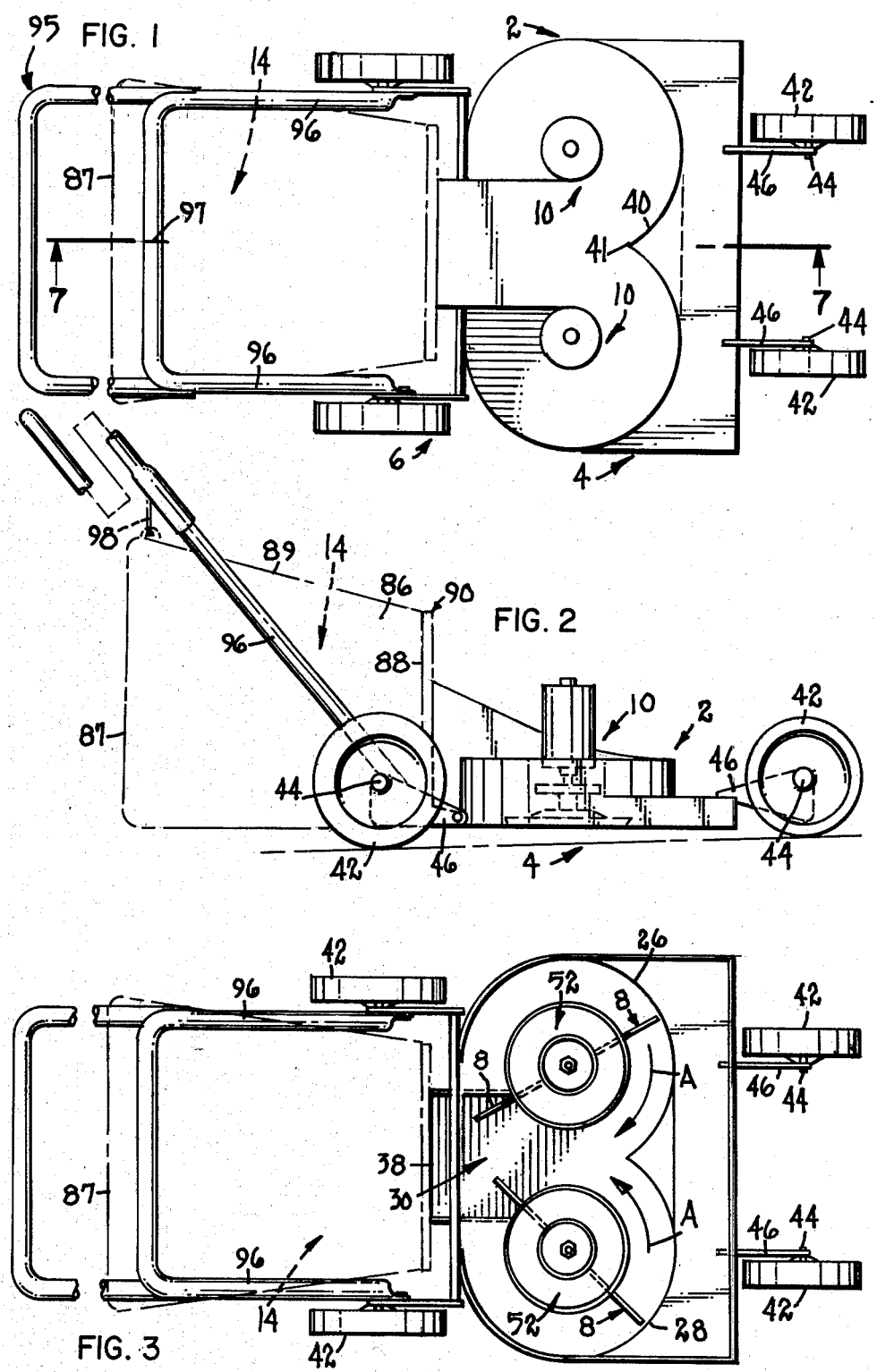

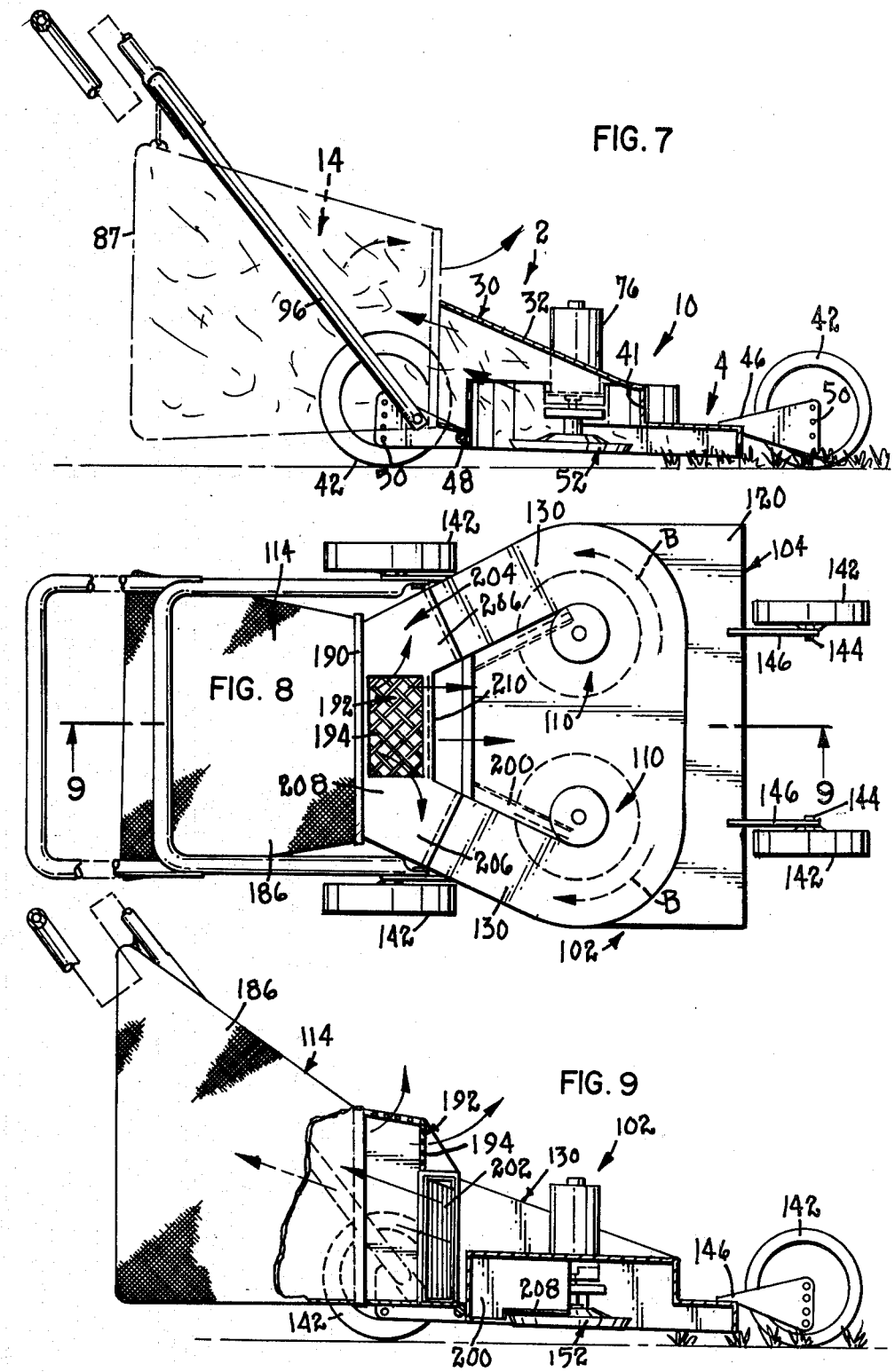

BAGGING FILAMENT MOWER

TECHNICAL FIELD

This invention relates in general to a lawn mower for cutting vegetation such as grass, other types of lawn cover, or the like. More particularly, this invention concerns a lawn mower having a flexible line cutting element which also is a bagging mower. This means the mower has ability to receive and store the cut grass particles which are severed by the cutting element for periodic dumping of these particles.

DESCRIPTION OF THE PRIOR ART

Motorized lawn mowers are well known for cutting grass and the like. Traditional lawn mowers of this type include a wheeled housing on which an internal combustion engine or electric motor is mounted. A relatively rigid steel cutting blade is mounted in the cutting chamber of the housing on the end of the drive shaft of the engine. As the drive shaft is rotated, the cutting edges of the blade sever the grass at predetermined heights above the ground surface depending on the height of the housing relative to the ground.

In addition, the previously known rigid blades have air baffles or sails for creating an air flow in the cutting chamber. This air flow agitates the grass blades back and forth about the base of the blades. During this oscillatory motion, the grass blades are eventually severed by the cutting blade when they are in a vertical position to ensure a uniform depth cut. In addition, the air flow also entrains the cut grass particles and carries them rearwardly through a discharge outlet in the housing.

Some type of a grass collecting bag attached to the housing usually receives and stores the cut grass particles. The transport of the cut grass particles from their point of severing to their deposition in the grass collector is a combination of both pneumatic transport and mechanical transport. Mechanical transport refers to the transporting action which occurs by virtue of the impingement of the rotating blade itself on the cut grass particles and the flinging of these particles towards the discharge outlet by the momentum of the cutting blade. Pneumatic transport refers to the transporting action resulting from the air flow induced by the sails on the cutting blade.

While the lawn mowers noted previously are effective in cutting grass, the use of a rigid steel blade as the cutting element is disadvantageous. The primary disadvantage resides in the safety aspects of a rigid steel blade. Such a blade when rotating can easily sever a body member accidentally or inadvertently placed in contact with the blade, e.g. a foot, finger, etc. While the incidents of such accidents are relatively small, they nonetheless occur because of the negligence of the operator or unforseen incidents which cause a leg or foot to be accidentally interposed into the path of a blade. Such incidents are disadvantageous both for the user, who experiences the loss of a body member, and also for the manufacturer, who must consider such accidents from a product liability standpoint.

One type of lawn mower which has been proposed as a replacement for the rigid blade lawn mower is a lawn mower which employes a flexible line cutting element. In such a lawn mower, the rigid blade is replaced entirely by one or more flexible lines which extend outwardly and which can be rotated in a substantially horizontal cutting plane. These lines will contact and sever the grass in a manner similar to that of a blade. However, the lines are sufficiently flexible so that they will not sever a body member, such as a finger, which is placed into contact therewith. Thus, the flexible line mower obviates the safety disadvantages of the rigid blade mower.

Unfortunately, with the flexible line mower the momentum developed by the flexible line cutting element is very small. In fact, this momentum is so small that mechanical transport of the cut grass particles is virtually absent. Thus, it has been thought that such a mower would not be suitable for use with a bagging attachment since no transport mechanism is present to carry the cut grass particles to the grass collector. Since the bagging attachment is a feature which many consumers desire, the lack of this feature in a filament mower would be a competitive disadvantage.

U.S. Pat. Nos. 4,065,913 and 4,126,990, to Fisher et al, disclose a lawn mower in which the cutting element comprises a cutter disc assembly having a plurality of flexible outwardly extending pins supported on the disc. The pins extend outwardly and are sufficiently rigid to be able to sever the grass. However, the pins are also sufficiently flexible such that they will not sever any body members inadvertently brough into contact with them. A plurality of radial vanes are provided for reinforcement and support of the pins. These vanes are also sufficiently large and are shaped to form fan like members on top of the disc. According to the patents, these vanes create an air flow which causes the cut grass particles to be swept through the cutting chamber into a bagging attachment.

While the patents noted above disclose a mode of transport for the grass particles which is primarily pneumatic, some transport of the grass particles is obtained by impingement of the pins on the particles in the manner of a rigid blade. Again, this momentum and impingement is absent for a flexible line cutting element. Moreover, most bagging attachments comprise flexible bags which when coupled to the mower are completely enclosed. With a totally pneumatic transport of the grass particles into the bag, the air flow will be deposited in the bag continuously. Such an air flow will soon build up a pressure head inside the bag. This will stop subsequent cut grass particles from being properly deposited therein even when the bag is not filled.

It is believed by Applicant that the lawn mower noted in the above patents does not disclose an efficient bagging mechanism for a non-rigid blade mower. It is postulated that such a mower would have poor grass deposition in the bag because of the pressure head which will build up in the bag. Although this pressure head may be partially alleviated if the bag is made from an air permeable material, as the bag becomes filled, or if the grass being bagged is particularly damp, more and more of the pores in the bag will become covered or clogged with the cut grass particles. Thus, the bag would eventually lose its capacity to transmit significant amounts of air and the pressure head would build up. The pressure head occurring inside the bag may become so large that grass is no longer deposited in the bag even though the bag is only partially full. Even if the pressure head does not become sufficiently large to prevent the bag from being filled, since the pressure head exists, greater energy must be used to deposit the grass particles in the bag than would otherwise be necessary without the pressure head. Such a lawn mower is accordingly either ineffective in properly bagging the grass or at the least is inefficient during the bagging operation.

SUMMARY OF THE INVENTION

Accordingly, it is an aspect of this invention to provide a lawn mower, i.e. a vegetation cutting device, having a flexible line cutting element which also functions effectively as a bagging mower. More particularly, one aspect of this invention relates to such a lawn mower which includes a pneumatic transport, i.e. an air flow, which is sufficiently strong to transport the cut grass particles into a bagging attachment and which does not build up an excessive pressure head in the attachment.

The lawn mower according to this invention comprises a housing. The housing has a cutting chamber which includes a discharge outlet. Means are provided for movably supporting the housing above a ground surface. In addition, the housing includes a means for rotating a flexible line cutting element in the cutting chamber. A grass collector is associated with the discharge opening for receiving therein cut grass particles discharged through the opening. In addition, means are provided for generating an air flow in the cutting chamber to cause the cut grass particles to be entrained and carried through the discharge opening into the grass collector. Finally, the mower of this invention includes means for continuously evacuating the air flow from the grass collector to allow the grass particles to be more easily deposited in the grass collector.

Other aspects of this invention relate particularly to the means for generating the air flow in the flexible line cutting mower noted above. This air flow generating means comprises a plurality of sails affixed to the support member to which the flexible cutter line is itself attached. These sails are preferably flexible in the same manner as the flexible cutter line. In other words, these sails are sufficiently flexible such that they will not sever a body member accidentally placed into contact therewith. Accordingly, the air flow generating means of this invention is considerably safer than other prior types of air flow generators in keeping with the enhanced safety of a flexible line mower.

Yet another aspect of this invention relates to a specific configuration of a flexible line cutting element mower of the type noted above. Specifically, this mower includes two cutting chambers each of which includes a flexible line cutting chamber. The cutting chambers are arranged to define grass discharge paths both of which lead to a grass collector. In addition, means are provided for generating an air flow in both of the cutting chambers which causes grass to be transported through the discharge paths into the grass collector.

Finally, yet another aspect of this invention relates to a vegetation cutting device that comprises a housing suited for movement over a ground surface. Rotatable support means is carried on the housing which support means has a perimeter. A flexible line cutting element is secured to the support means for rotation therewith. The flexible line cutting element includes a free end portion that extends in a cutting plane radially out past the perimeter of the support means to sever the vegetation. Means is also provided for agitating the vegetation to facilitate the cutting thereof. This vegetation agitating means is located above the cutting plane and at least partially radially out past the perimeter of the support means to be located above at least a portion of the area of the ground surface traversed by the free end portion of the flexible line cutting element during rotation thereof. This agitating means effects better agitation of the vegetation being cut by the free end portion.

BRIEF DESCRIPTION OF THE DRAWINGS

This invention will be described hereafter in the following Detailed Description, when taken in conjunction with the following drawings, in which like reference numerals will refer to like elements throughout.

FIG. 1 is a top plan view of a first embodiment of an improved lawn mower according to this invention;

FIG. 2 is a side elevational view of the improved lown mower of FIG. 1;

FIG. 3 is a bottom plan view of the improved lawn mower of FIG. 1, particularly illustrating the dual cutting chambers and flexible line cutting elements of the lawn mower;

FIG. 7 is a cross-sectional view of the improved lawn mower of FIG. 1, taken along lines 7—7 in FIG. 1;

FIG. 8 is a top plan view of a second embodiment of an improved lawn mower according to this invention;

FIG. 9 is a side elevational view, with a portion thereof broken away and shown in cross-section, of the improved lawn mower shown in FIG. 8, taken along lines 9—9 in FIG. 8;

DETAILED DESCRIPTION

Figure 4:
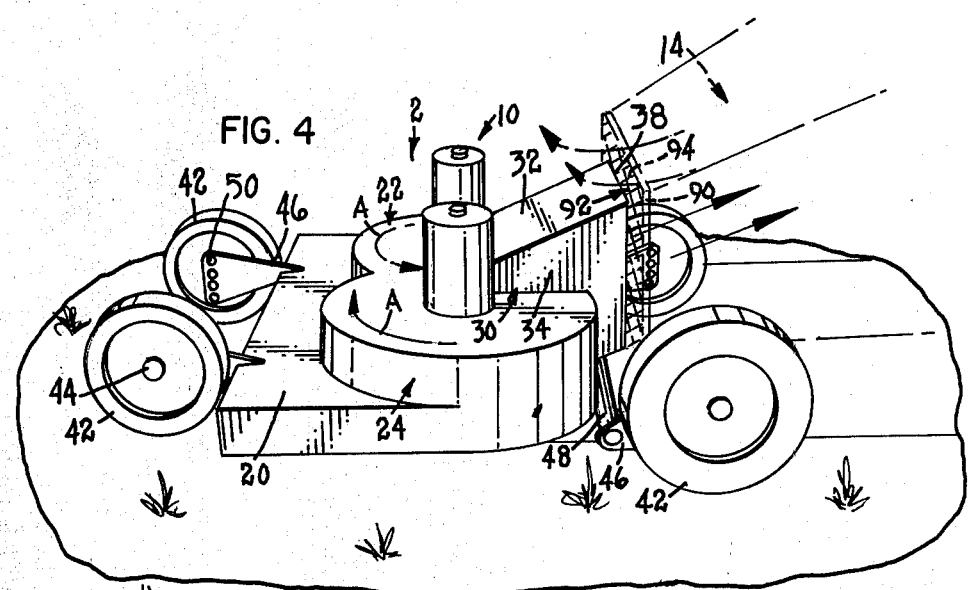
FIG. 4 is a partial perspective view of the improved lawn mower of FIG. 1, particularly illustrating the air flow path, grass collector, and the air escape passageways in the grass collector.

Referring first to FIG. 1, an improved lawn mower according to a first embodiment of this invention is generally illustrated as 2. Lawn mower 2 comprises a number of inter-related components. Each of the components of lawn mower 2 will be described in detail hereafter. However, by way of introduction, lawn mower 2 comprises a housing 4, support means 6 for movably supporting housing 4 above the ground, a flexible line cutting element 8 for severing or cutting grass at a predetermined height above the ground, motor or power means 10 for powering cutting element 8, means 12 for generating a pneumatic air flow in housing 4 for causing the cut grass particles severed by cutting element 8 to be carried to a discharge outlet in the housing, and a grass collector 14 for receiving and storing the grass clippings or the particles of cut grass which have been severed by cutting element 8 and which have been propelled by the air flow generating means 12 through the discharge outlet.

Lawn mower 2 is primarily intended for cutting grass or any other vegetation suitable for use as ground cover. However, the type of vegetation being cut by lawn mower 2 is not important to the present invention as long as it can in fact be properly cut by cutting element 8. Thus, the term "grass" as used herein is not meant to limit the present invention.

Figure 10:
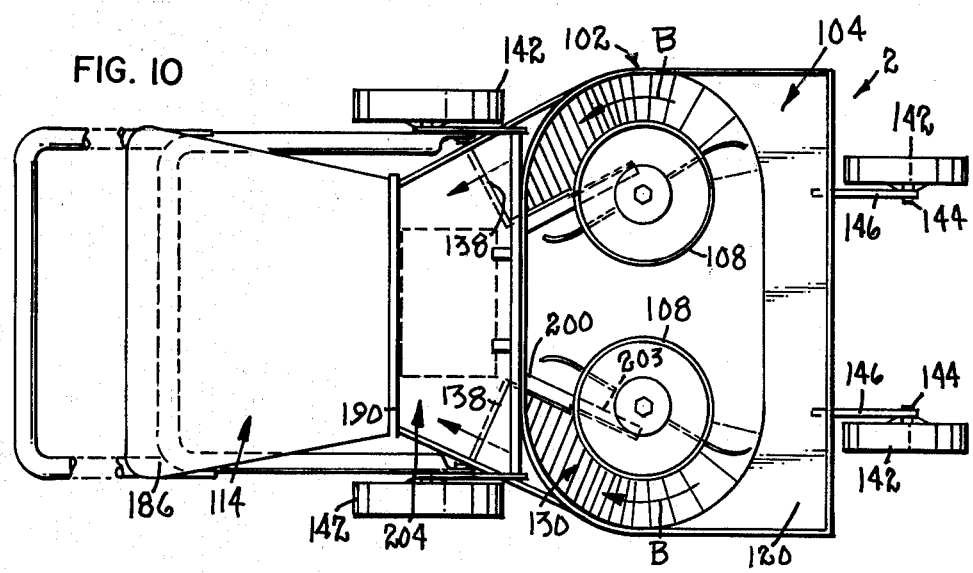
FIG. 10 is a bottom plan view of the improved lawn mower of FIG. 8, particularly illustrating the dual cutting chambers, grass discharge paths, and flexible line cutting elements thereof.

A second embodiment of an improved rotary lawn mower according to this invention is illustrated as 102 in FIGS. 8-10. Many of the features of lawn mower 2 are the same in lawn mower 102. Thus, the first embodiment of the lawn mower, i.e. lawn mower 2, will be described in detail. Then, the specific differences between lawn mowers 2 and 102 will be pointed out in a description of the lawn mower 102.

THE HOUSING

Referring now to FIGS. 1-7, housing 4 includes a flat, generally horizontal deck 20. First and second side-by-side cutting chambers 22 and 24 are located on deck 20 adjacent the rear thereof. Cutting chambers 22 and 24 are defined respectively by a downwardly opening generally B-shaped chamber or recess located on the underside of deck 20. This B-shaped recess includes a first generally circular portion 26 and a second side-by-side generally circular portion 28. Cutting chambers 22 and 24 are defined respectively by the circular portions 26 and 28 which are also extended upwardly through deck 20 such that the generally circular appearance of cutting chambers 22 and 24 is preserved when looking at the top of lawn mower 2. See FIG. 4.

A grass discharge passageway in the shape of an upwardly sloping ramp 30 communicates with both of the cutting chambers 22 and 24. Ramp 30 includes a top wall 32 and spaced side walls 34 and 36 which form a generally open passageway which communicates with cutting chambers 22 and 24 and extends rearwardly to terminate in a discharge outlet 38. Discharge outlet 38 is spaced in back of the rear side of cutting chambers 22 and 24. In addition, discharge outlet 38 is generally rectangular having a predetermined cross-sectional area. The size and shape of ramp 30 and discharge outlet 38 may vary from that described herein. Preferably, all of the components of housing 4 are integrally molded or cast with deck 20, cutting chambers 22 and 24, and ramp 30 being simultaneously and integrally formed. Any suitable materials may be used in constructing housing 4, e.g. a strong, lightweight metal or fiberglass material.

Figure 15:
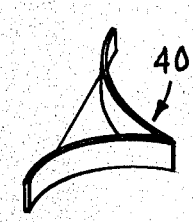
FIG. 15 is a perspective view of an insert which may be used in the cutting chambers in the mowers of FIGS. 1 and 8 to help define the shape of the cutting chamber.
Figure 6:
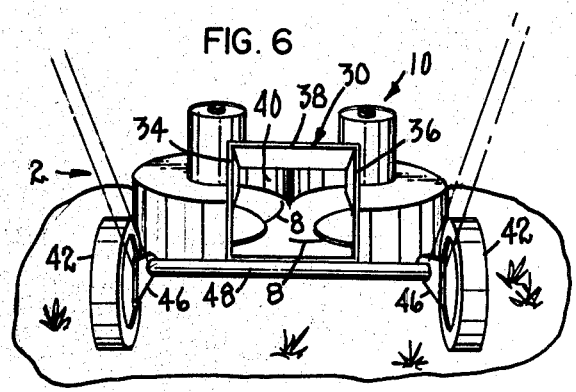
FIG. 6 is a partial rear elevational view of the improved lawn mower shown in FIG. 1, taken from a position between the handle bars of the lawn mower and particularly illustrating the discharge outlet for the cutting chamber when the grass collector is removed.

The generally B-shaped orientation of the recess which defines cutting chambers 22 and 24 is provided by a generally triangular baffle 40. Baffle 40 is fixed on the front wall of the recess with the apex 41 of the baffle being located midway between the cutting chambers 22 and 24 as shown in FIG. 4. Alternatively, a generally oval shaped recess having a straight front wall can be provided with the baffle 40 constituting a replaceable insert in the recess. Such a replaceable baffle 40 is illustrated in FIG. 15. This type of a replaceable baffle 40 can be releasably contained in the recess by any suitable means, e.g. threaded securing means such as bolts or screws. In addition, as yet another alternative, the baffle 40 may be removed entirely in which case the recess will no longer be generally B-shaped, but will then have a straight front wall to give the recess a generally race track or oval shape. Whether or not baffle 40 is used depends on whether the grass movements in cutting chambers 22 and 24 should be kept separate from one another until they reach the discharge passageway defined by ramp 30. It is currently thought by Applicant that the use of baffle 40 would not strictly be necessary in this invention.

THE SUPPORT MEANS

Support means 6 for movably supporting housing 4 above the ground includes four rotatable wheels 42 located generally adjacent each corner of housing 4. Each wheel 42 includes a laterally extending stub shaft 44. Wheels 42 are generally secured to housing 4 by support brackets 46. The front support brackets 46 are simply welded or fixedly secured to the front of deck 20. The rear support brackets 46 are welded or otherwise fixedly secured to a laterally extending support rod 48 on the rear of housing 4. Each support bracket 46 includes an array of vertically spaced holes 50. Stub shaft 44 is designed to be releasably coupled in any conventional manner in one of the holes 50. Thus, the height of deck 20 relative to the ground can be adjusted by placement of the wheels 42 in differing ones of the holes 50.

The arrangement noted above for supporting the wheels 42 is only one type which may be used to adjustably support housing 4 relative to the ground. Any other conventional arrangement could be used.

While it is preferred that support means 6 comprise generally conventional wheels 42, any suitable means for movably supporting housing 4 above the ground could be used. For example, the support means 6 could comprise an air cushion or the like generated by operation of a suitable fan or rotor. This air cushion could be directed downwardly toward the ground to movably float or support the housing thereabove. In addition, either the front or the rear wheels on the housing could be self-propelled. Thus, the particular type of support means which is utilized is not critical to this invention.

THE FLEXIBLE LINE CUTTING ELEMENT

Figure 12:
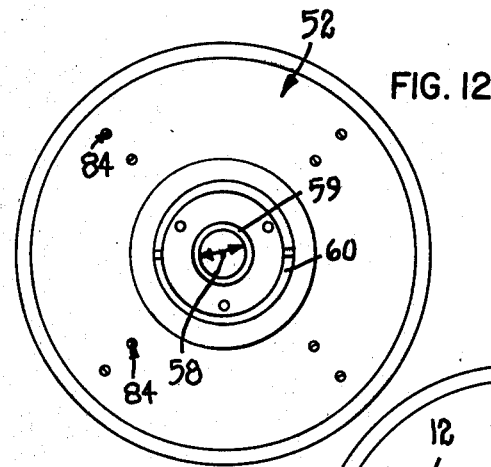
FIG. 12 is a bottom plan view of a conical flexible line support member which is a portion of the cutting element of FIG. 11.

Referring now to FIG. 12, flexible line cutting element 8 comprises a conical disc 52 having a downwardly sloping top surface 54 which terminates at the base of the cone in an upturned lower flange 56. Cone 52 is truncated and terminates at its upper end in a horizontal surface 57. A generally circular bore or opening 58 is located in the middle of horizontal surface 57 and is bounded both above and below surface 57 by a vertical sleeve 59. In addition, a second cylindrical sleeve 60 is located on surface 57 and projects downwardly from the bottom thereof. Sleeve 60 is concentrically arranged relative to sleeve 59.

Cutting element 8 further includes a means for releasably coupling cone 52 to the drive shaft 62 of motive means 10. This coupling means includes a generally T-shaped cone retainer 64. Retainer 64 includes a generally cylindrical sleeve 66 which slips over the end of drive shaft 62 and passes upwardly through sleeve 59 of cone 52. In addition, retainer 64 includes a substantially horizontal and circular flange 68 which is received inside sleeve 60 on cone 52 to support cone 52 thereon. Retainer 64 is coupled to drive shaft 52 by means of a threaded retaining nut 70 which threads onto a reduced and threaded outer end section 72 of drive shaft 62. Flange 68 of retainer 64 includes an annular chamber 67 located adjacent sleeve 66.

Figure 11:
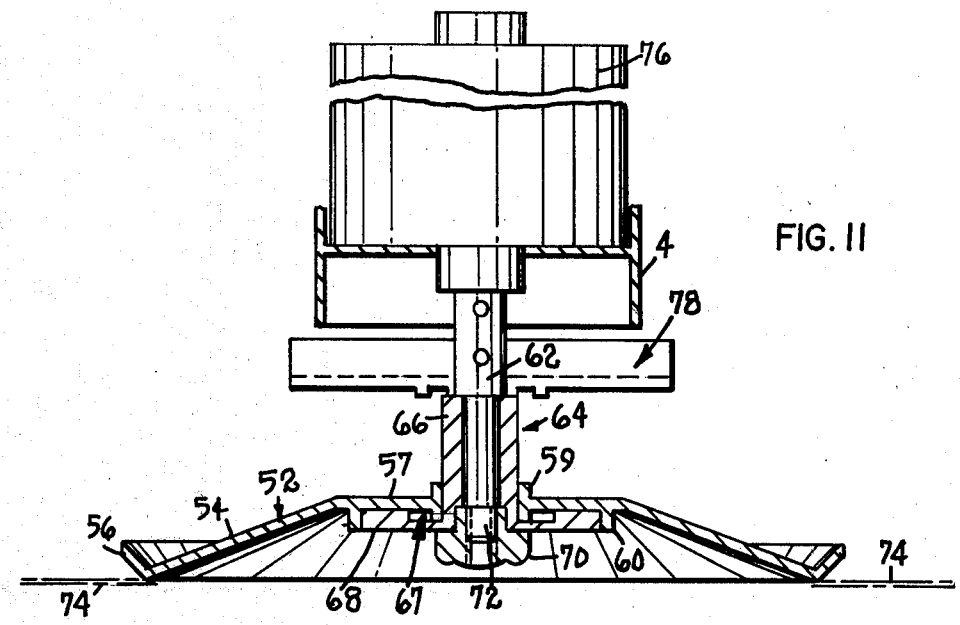
FIG. 11 is a partial side elevational view of the flexible line cutting element used in the lawn mower of FIGS. 1 and 8 and of the motor means for rotating the same.

Cutting element 8 further comprises at least one, and preferably two, line cutting elements, each generally designated as 74. Each line 74 may be any type of flexible filament of the type which is used in filament line trimmers and similar devices. Each line 74 has its inner end secured in any suitable manner to cone 52, i.e. by threading the inner end of line 74 into chamber 67 and securing it there. Then, the outer end of each line 74 extends outwardly from each side of recess 67 through aligned channels (not shown) in flange 68 and sleeve 60, downwardly along the underside of the downwardly tapering surface 54, and then outwardly along the lower flange 56. Preferably, lines 74 are 180° offset around the periphery of cone 52 as shown in FIG. 11. When cutting element 8 is rotated, centrifugal force will cause the outer ends of lines 74 to assume a generally horizontal position extending straight out from the lower end of flange 56. Lines 74 will thus be rotated in a cutting plane which is generally horizontal. Preferably, the cutting plane defined by the rotation of lines 74 should be slightly tilted down towards the front of housing 4 such that the leading edge of the cutting arc is lower than the trailing edge. However, this tilt is not strictly necessary.

An important feature of lawn mower 2 is the use of a flexible line cutting element 8. Lines 74 when rotated will not sever a body member, such as a finger or a foot, which is accidentally placed into contact therewith. Thus, flexible line cutting element 8 is safer than rigid blade cutters. In addition, any suitable mechanism may be incorporated in lawn mower 2 to automatically feed out additional amounts of each line 74 should the lines be broken. Because two cutting chambers 22 and 24 are provided on housing 4, separate flexible line cutting elements 8 are located in each of the cutting chambers for rotation about a generally vertical axis. These cutting elements may overlap one another along the centerline of housing 4 if desired. However, alternatively, the lines 74 may be staggered or tilted relative to one another such that they do not interfere with one another during their rotation.

THE MOTIVE MEANS

Preferably, the motive means 10 comprises any suitable electrical motor 76 which may be supported in any conventional manner on housing 4. Drive shaft 62 of motor 76 extends downwardly through housing 4 to be coupled to one of the flexible line cutting elements 8. Two such motors 76 are illustrated herein with one motor 76 coupled to one cutting element 8. In addition, each motor 76 includes a fan 78 on drive shaft 62. Fan 78 will be rotated by rotation of drive shaft 62 to cause an upwardly directed cooling flow to pass over motor 76. While the use of electric motor 76 is preferred, any other suitable power source, such as an internal combustion engine, could be substituted therefor. While two motors 76 are preferred for the two flexible line cutting elements 8, a single motor could be substituted therefor with some type of gearing or drive transmission arrangement from the single motor to the dual flexible line cutting elements 8.

THE AIR FLOW GENERATING MEANS

Figure 13:
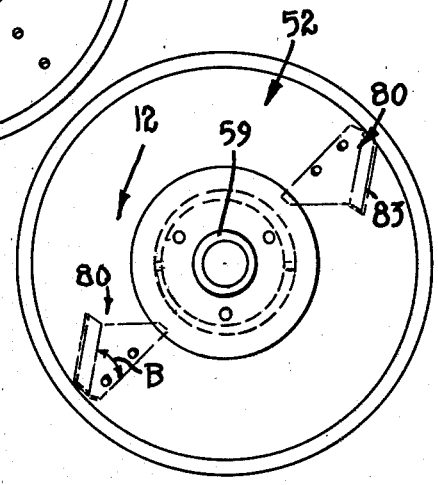
FIG. 13 is a top plan view of the conical flexible line support member shown in FIG. 12, particularly illustrating two air baffles or sails attached to the top surface thereof for use in generating an air flow in the cutting chamber.
Figure 14:
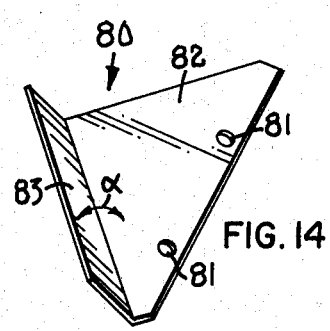
FIG. 14 is a perspective view of one of the sail members shown in FIG. 13.

Referring now particularly to FIGS. 12-14, a means is provided in lawn mower 2 for generating an air flow in each of the cutting chambers 22 and 24. This air flow is sufficiently strong to entrain the cut grass particles severed by cutting elements 8 and carry those particles into and through discharge outlet 38. In other words, a primarily pneumatic transport of the cut grass particles is established since any mechanical transporting action by the flexible lines 74 is virtually nonexistent.

The air flow generating means 12 comprises a plurality of air baffles or sails generally referred to as 80. Each sail 80 includes a mounting surface 82 having a plurality of mounting holes 81 therein. In addition, each sail 80 includes an upwardly extending working surface 83. Working surface 83 is angularly oriented to the vertical, i.e. the angle between mounting surface 82 and working surface 83 is denoted as and preferably about 120°. While sails 80 could be made from any material, they are preferably made from a relatively soft flexible plastic material.

Cone 52 in each cutting element 8 includes an array of mounting holes 84. Four sets of such mounting holes 84 are circumferentially spaced around cone 52 and are located on top surface 54. Preferably, at least one sail 80 is mounted on top surface 54 by threaded securing members, e.g. bolts, which extend through mounting holes 81 and holes 84 to couple sail 80 thereto. Preferably, two such sails 80 are used spaced 180° apart around the circumference of cone 52. See FIG. 13. When these sails are mounted on cone 52, working surface 83 is angularly oriented or swept back relative to a radial line from the center of disc 52 to its periphery. The degree of sweep back is indicated generally as in FIG. 13.

When cone 52 is rotated by rotation of mower 76, sails 80 will be rotated therewith. Working surface 83 of each sail 80 acts as a fan blade and generates the above mentioned air flow. For lawn mower 2, drive motors 76 are rotated in opposite directions such that the air flows generated by sails 80 in the cutting chambers 22 and 24 are oppositely disposed and both discharge into the ramp 30. The air flow in each of the cutting chambers is illustrated by the arrows A in FIGS. 3 and 4. The use of a soft plastic material for sails 80 is preferred. Preferably, the plastic material should be sufficiently soft to allow the sail to be flexible should it contact a body member accidentally interposed into cutting chambers 22 or 24. This enhances the safety features of lawn mower 2.

THE GRASS COLLECTOR

Grass collector 14 includes a hollow container of finite capacity which preferably comprises a flexible and generally rectangular bag 86. Bag 86 is made from a relatively soft, pliable material, such as an air porous fabric or the like, to allow bag 86 to be expandable. Bag 86 has a closed upper end 87 and an open lower end 88. A rigid U-shaped bag frame could be sewn or otherwise secured to the top wall 89 of bag 86 to give some rigidity to the bag. This bag frame could be secured to a generally rigid and rectangular mouth or chute portion 90 of the bag 86. While a flexible bag 86 is preferred, a rigid plastic container of generally similar shape could be used in place thereof.

Figure 5:
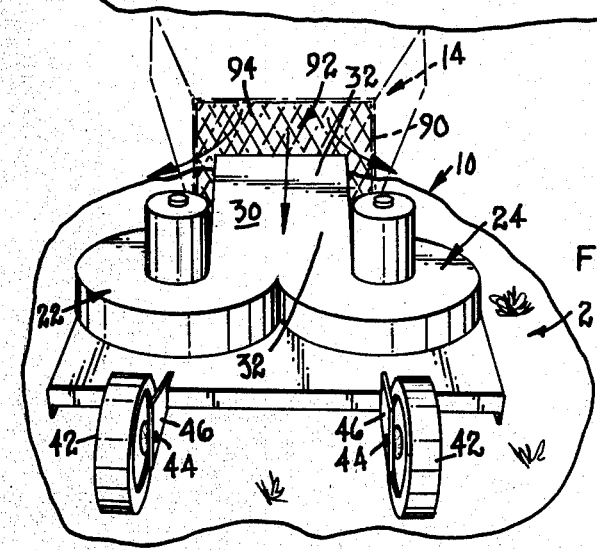
FIG. 5 is a partial front plan view of the improved lawn mower shown in FIG. 1, again particularly illustrating the air escape passageways for the grass collector.

An important feature of this invention relates to chute 90. Grass collector 14 is supported on housing 4 with chute 90 being placed in a mating face-to-face relationship with discharge outlet 38. Chute 90 is in the form of a generally rectangular frame which is secured to the open mouth of bag 86 in any suitable manner, e.g. by sewing frame 90 to a pocket provided in the mouth of bag 86. As shown in FIGS. 1, 4, and 5, chute 90 has a cross-sectional area which is larger than the cross-sectional area of discharge outlet 38. Because of the difference of size in these components, certain areas of chute 90 will be located exteriorly and adjacent to ramp 30. These areas are covered by a perforated screen or grill 92 which defines a plurality of air discharge or escape outlets 94. These air outlets 94 provide a means for evacuating grass collector 14 as it is being filled to ensure that the air flows being deposited therein have an escape path. This is advantageous for the reasons noted hereafter.

Grass collector 14 is preferably releasably coupled in any conventional manner to housing 4. This allows grass collector 14 to be periodically removed and the grass clippings dumped therefrom. Preferably, the housing 4 includes a handle 95 which includes two upwardly extending handle bars 96 and a cross bar 97. The closed rear end 87 of bag 86 may be supported on cross bar 97 by any suitable hanger 98. In addition, chute 90 may be coupled on housing 4 in any generally conventional manner. For example, chute 90 could be formed in the manner of an elongated chute which is telescopically received in a seat on housing 4 adjacent discharge outlet 38. This type of releasable interconnection is disclosed in U.S. patent application, Ser. No. 44,168, filed on May 31, 1979, and assigned to the assignee of this invention.

OPERATION OF THE LAWN MOWER

In the operation of lawn mower 2, each of the electric motors 76 will be actuated to rotate cutting elements 8 in each of the cutting chambers 22 and 24. The rotation of flexible lines 74 will sever the grass at a predetermined height above the ground as determined by the height of housing 4. The air flow generated by sails 80 will entrain the grass particles to carry them through the discharge paths as noted by the air flows A. These air flows are continuously evacuated from bag 14 by means of air escape outlets 94. Thus, an excessive pressure head will not build up inside bag 86 which pressure head would otherwise tend to interfere with the proper deposition of the cut grass particles therein. Thus, lawn mower 2 according to this invention can efficiently and effectively bag the cut grass particles in terms of completely filling bag 86 and also in terms of placing the cut grass particles into bag 86 with the least possible energy.

Another feature of this invention relates to the use of flexible sails 80 on cone 52. Such sails 80 are configured to generate suitable air flows when rotated. However, they are also sufficiently flexible so that they will not sever a body member, such as a finger or foot, accidentally placed into the cutting chamber and into contact with the sail. Thus, sails 80 do not otherwise detract from the safety advantages given by the use of flexible lines 74 and contribute to the safety aspects of the machine.

Finally, another feature of this invention is the use of dual cutting chambers 22 and 24 having grass discharge paths which lead to a common discharge outlet. This allows a single grass collector 14 to be associated with the discharge outlet and receive the flow of grass particles from each of the cutting chambers. In addition, the placement of ramp 30 and discharge outlet 38 between and to the rear of cutting chambers 22 and 24 allows a generally centralized collector 14 to be used and is preferred.

THE EMBODIMENT OF FIGS. 8–10

Lawn mower 102 in FIGS. 8–10 is generally similar in many respects to lawn mower 2. Components in lawn mower 102 which are identical to components in lawn mower 2 will be identified by the same reference numerals with a prefix 100 attached thereto. Only the differences between the lawn mower 2 and 102 will be specifically discussed.

The primary difference between lawn mower 102 and lawn mower 2 relates to the shape of the grass discharge paths and the mouth 190 of grass collector 114. Referring specifically to FIGS. 8 and 10, the single ramp 30 of lawn mower 2 has been replaced by means of two grass discharge ramps 130 with one ramp 130 for each cutting chamber 122 or 124. In addition, cutting elements 108 are rotated in the same direction so that the grass discharge paths, identified by the arrows B in FIG. 10, discharge the cut grass particles to the outside of the housing into each of the ramps 130. Recirculation of the cut grass particles 130 is prevented by a fixed baffle 200 which is positioned along the inside wall 202 of ramp 130 and which comes down and closely covers cutting element 108. Referring to FIG. 9, baffle 200 has a notch 203 which comes down and is closely adjacent to the cone 152 with only a slight clearance between baffle 200 and cone 152. Baffles 200 prevent recirculation of the cut grass particles in the cutting chambers and ensure that these grass particles will be discharged through the dual discharge outlets 138 defined at the ends of ramps 130.

In addition, the mouth 190 of grass collector 114 includes a forwardly extending elongated chute portion 204 having hollow rectangular outwardly projecting arms 206. Each of the arms 206 is adapted to mate with the rectangular discharge outlets 138 of ramp 130. In addition, chute 204 includes a top wall 208 and a front wall 210 positioned between the arms 206. The air discharge outlets 194 are provided by a perforated grill or screen 192 located in each of the walls 208 and 210 of chute 204.

Other than the different configuration of the grass discharge paths including the use of dual ramps 130, discharge outlets 138, and an elongated chute 204 on mouth 190, lawn mowers 2 and 102 are generally identical and function similarly. The air discharge outlets 194 provided by grills 192 allows sufficient air to escape from grass collector 114 to provide an efficient means for evacuation of bag 186. This allows proper grass deposition in the same manner as lawn mower 2.

In either of the embodiments just described, the evacuating air discharge outlets 94 and 194 could be provided on that part of the housing which is immediately adjacent to mouth 90 or 190 of grass collectors 14. For example, in lawn mower 102, the chute portion 204 of grass collector 14 could in fact be formed as part of the housing. In this case, the dual grass discharge paths would again be rejoined into a single discharge outlet at the rear of housing 4. The mouth 190 of the grass collector would then be rectangular and of the same size as the discharge outlet 138. However, the perforated grills 192 would still be used in the same positions as shown in FIGS. 8 and 9 such that the air discharge outlets 194 are now contained on the housing 4 immediately adjacent the mouth 90.

THE EMBODIMENT OF FIGS. 16 AND 17

An improved flexible line cutting element is illustrated as 220. The major improvement in cutting element 220 is an improved means for agitating the vegetation being cut and for generating the air flow used in bagging the cut vegetation particles. This agitating means is generally identified as 222. Cutting element 220 and agitating means 222 can be used in place of the flexible line cutting elements shown in lawn mowers 2 and 102. However, the improved cutting element 220 can also be used in any lawn mower in which just a single flexible line cutting element, rather than the dual cutting elements, shown in lawn mowers 2 and 102, is utilized. Moreover, agitating means 222 and cutting element 220 can be used on a vegetation cutting device, such as a lawn mower, even if the device does not incorporate the types of grass collectors shown in FIGS. 1-15, but uses a more conventional grass collector or no collector at all. This is so because agitating means 222 improves the quality of cut with superior agitation which would be useful even without grass collection.

Flexible line cutting element 220 includes a rotatable support means comprising a substantially flat circular plate or disc 224. Disc 224 includes an outer circumference or periphery 230. Two flexible cutting lines 226 and 228 extend radially outwardly from disc 224. Cutting lines 226 and 228 include a free end portion 232 that extends radially out past the perimeter 230 of disc 224. Preferably, flexible lines 226 and 228 extend out underneath disc 224 and have an interior or storage end portion 234 that is secured to disc 224 in any suitable manner. For example, the storage end portion 234 of each line 226 and 228 could be secured to a suitable means for indexing the line outwardly if the line should become shortened due to use or breakage. Disc 224 is secured to the shaft of a drive motor (not shown) carried on the lawn mower housing (not shown) for rotation of disc 224.

Figure 16:
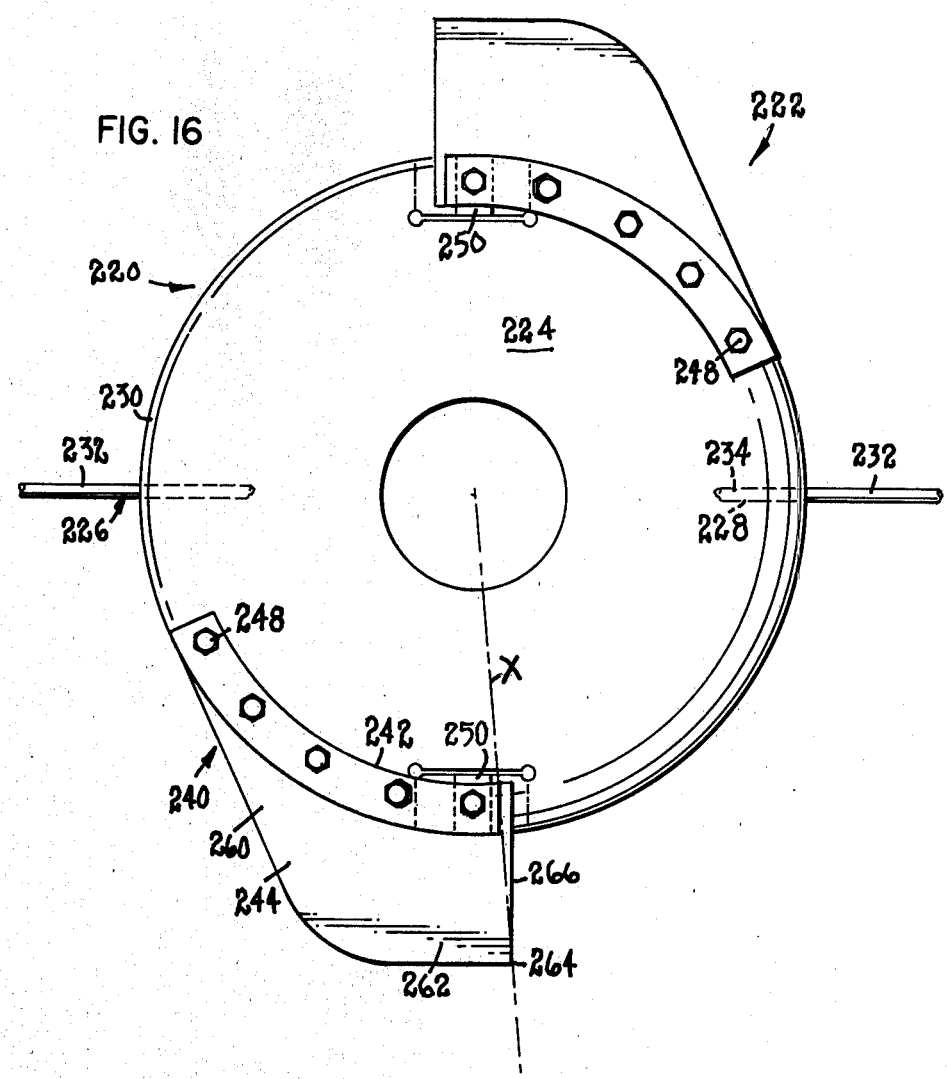
FIG. 16 is a top plan view of another embodiment of the flexible line cutting element that could be used in the lawn mower shown in FIGS. 1 and 8 or a similar vegetation cutting device having only a single flexible line cutting element particularly illustrating an improved version of the vegetation agitating means comprising two air baffles or sails which are attached to the support means for the flexible line cutting element and which extend radially out past the perimeter thereof.
Figure 17:
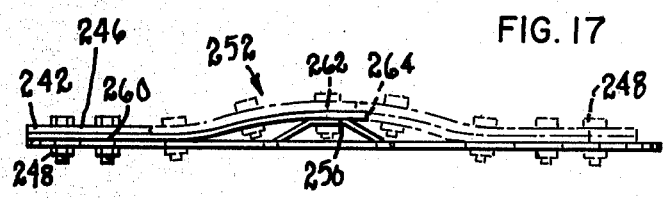
FIG. 17 is a side elevational view, partially in cross-section, of the improved flexible line cutting element shown in FIG. 16, taken along lines 17—17 in FIG. 16.

The agitating means 222 particularly comprises two generally identical sail members each of which is illustrated as 240. Since sail members 240 are identical, a description of one sail member 240 will suffice to describe the other. Sail members 240 are generally triangular and include an inner side 242 and an outer side 244. Inner side 242 is fixedly secured in any suitable manner to the top surface of disc 224. For example, as shown in FIGS. 16 and 17, a clamping plate 246 extending along the entire length of underside 242, and threaded securing members 248, such as bolts or the like is used to clamp or otherwise fix sail member 240 to disc 224. In addition, disc 224 includes a ramp 250. Ramp 250 is spaced vertically above the top surface of disc 224. A portion of the sail member 240 is secured on top of ramp 250 by the clamping plate 246. (See FIG. 17). This change in the elevation of sail member 240 as one proceeds from the front side to the rear side thereof means that at least a portion of the sail member 240 defines a working face 252 that rises vertically for generation of a suitable agitating air flow. This amount of rise on working face 252 can obviously vary with a ½ inch rise being one acceptable value.

Referring now particularly to the outer side 244 of the sail member 240, this side extends radially out past the perimeter 230 of disc 224. In addition, outer side 244 includes a first leading portion 260 of gradually increasing radial length. Leading portion 260 is connected to a trailing portion 262 of generally constant radial length. Trailing portion 262 terminates at an outer edge 264 that is radially outward from the perimeter 230 of disc 224. A rear side 266 of the sail member 240 leads radially inward from the outer edge 264 of the trailing portion 262. Rear side 266 of the sail member 240 lies behind a radial line, indicated as X, connecting the center of disc 224 and the outer edge 264 for a purpose to be described hereafter.

Preferably, sail member 240 is made from a relatively flexible stretchable material. One preferred material for sail member 240 is a rubber reinforced ply material such as that customarily used in the construction of automobile tires and the like. Such a material will be relatively thin as depicted in FIG. 17. However, any suitably flexible material could be used. Preferably, the material used for sail member 240 should be sufficiently flexible so as to be non-injurious to the user of the lawn mower even when sail member 240 is rotated.

As noted earlier, two identical sails 240 are used located 180 degrees apart around the periphery of disc 224. The exact placement of the sails is not critical, but each of the sail members should lead the following flexible line 226 or 228 by 15° to 120°. As shown in FIG. 16, one preferred arrangement is to place the sail members 240 at approximately 90 degrees in advance of the flexible lines 226 and 228.

Applicant has found that the sail members 240 create a particularly effective agitation of the vegetation being cut by the flexible line. Because the sail members 240 are located radially out from the perimeter of the disc 224, they are in effect located above the area of the ground being cut by the cutting lines 226 and 228. This effects a more direct agitation of the vegetation since the sail members are not radially inboard from the flexible cutting lines.

However, Applicant has also discovered that it is not necessary for the sail members to extend radially out as far as the top of the free end portions 232 of the cutting lines. In fact, it is preferred that the outer edge 264 of the trailing portion 262 of the sail members 240 terminate radially inboard from the free end portions 232 of the flexible cutting lines. For example, when the free end portions of the cutting lines extend out 3½ inches from the perimeter of the disc, one effective arrangement for the sail members has been found to be a sail member which is 2½ inches inboard of the free end portion of this cutting line and only 1 inch radially out from the perimeter of the disc. Such a sail member still effects superior agitation of the grass since it is out at least partially over the area of the grass being cut by the cutting lines. In addition, rear side 266 of sail member 240 lies behind the radial line X extending from the center of the cutting disc to the outer edge of the trailing portion. This added material helps to stiffen the sail during rotation thereof and allow it to act more effectively to generate an air flow and agitation of the grass. However, both of these features while preferred, are not necessary for using a sail placed radially outboard of the perimeter of the cutting disc and above the flexible lines.

Another advantage of placing the sail members 240 radially inboard of the tips of the free end portions 232 of the cutting lines is that the sail members will encounter or see somewhat less uncut grass than if they extended all the way outboard over the entire length of the cutting line. Less abrasion will therefore occur on the sail members. Moreover, applicant has found that by using sail members 240 and improving the quality of cut, the cutting disc 224 can be rotated at a somewhat slower rpm than that conventionally used for flexible line cutting devices. For example, disc 224 can be rotated at approximately 3800 rpm as opposed to 6500 rpm. This has numerous advantages including the fact that four cycle as opposed to two cycle engines can be used to power disc 224 along with the fact that with the lower rpm there will be less impact resulting from thrown objects.

Various modifications of this invention will be apparent to those skilled in the art. Thus the scope of this invention is to be limited only by the appended claims.

I claim:

1. A vegetation cutting device, which comprises:
  (a) a housing suited for movement over a ground surface;
  (b) rotatable support means carried on the housing and having a perimeter;
  (c) a flexible line cutting element secured to the support means for rotation therewith, wherein the flexible line cutting element includes a free end portion that extends in a cutting plane radially out past the perimeter of the support means to sever the vegetation; and
  (d) means for agitating the vegetation to facilitate cutting thereof, wherein the vegetation agitating means is at least one rotatable sail member located above the cutting plane, wherein the sail member is sufficiently flexible such that it will deform under impact with a body member of a person using the lawn mower without severing the body member, wherein the sail member is operatively connected to the support means for conjoint rotation therewith in a cantilever manner such that the sail member has an unsupported radial outer side, the sail member and the cutting element being unconnected except for their common rotation with the support means, and wherein the sail member extends radially out past the perimeter of the support means sufficiently far to be located above at least 25% of the length of the free end portion of the flexible line cutting element during rotation thereof, whereby the agitating means effects better agitation of the vegetation being cut by the free end portion.

2. A vegetation cutting device as recited in claim 1, wherein the sail member is located 15° to 120° in advance of the flexible line cutting element in the direction of rotation of the support means.

3. A vegetation cutting device as recited in claim 2, wherein the sail member is located approximately 90° in advance of the flexible line cutting element in the direction of rotation of the support means.

4. A vegetation cutting device as recited in claim 2, wherein the sail member is fixedly secured to the support means for rotation therewith and is made from a relatively flexible material.

5. A vegetation cutting device as recited in claim 1, wherein the sail member has a vertically extending working face with a predetermined area, and wherein at least 50% of the area of the working face is located within three-quarters of an inch of the cutting plane to effectively agitate the vegetation.

6. A vegetation cutting device as recited in claim 5, wherein approximately 100% of the area of the working face is located within three-quarters of an inch of the cutting plane.

7. A vegetation cutting device as recited in claim 1, further including means for stiffening that portion of the sail member extending radially out past the perimeter of the support means during rotation thereof to minimize flutter of the sail member.

8. A vegetation cutting device, which comprises:
  (a) a housing suited for movement over a ground surface;
  (b) rotatable support means carried on the housing and having a perimeter;
  (c) a flexible line cutting element secured to the support means for rotation therewith, wherein the flexible line cutting element includes a free end portion that extends in a cutting plane radially out past the perimeter of the support means to sever the vegetation; and
  (d) means for agitating the vegetation to facilitate cutting thereof, wherein the vegetation agitating means is located above the cutting plane and at least partially radially out past the perimeter of the support means to be located above at least a portion of the area of the ground surface traversed by the free end portion of the flexible line cutting element during rotation thereof, whereby the agitating means effects better agitation of the vegetation being cut by the free end portion, wherein the agitating means comprises a substantially flexible sail member fixedly secured to the support means, wherein the sail member includes an outer side which is located radially out past the perimeter of the support means, wherein the outer side of the sail member includes a leading portion of gradually increasing radial width and a trailing portion of constant radial width taken in the direction of rotation of the support means, whereby the leading portion effects a smooth transition to the trailing portion of the sail member to minimize flutter of the flexible sail member.

9. A vegetation cutting device as recited in claim 8, wherein the trailing portion of the sail member terminates in an outer edge, wherein the sail member includes a rear side extending radially inwardly from the outer edge of the trailing portion, and wherein the rear side is located behind a radial line extending between the center of the support means and the outer edge of the trailing portion to stiffen the sail member during rotation thereof.

10. A vegetation cutting device as recited in claim 8, wherein the sail member includes a working face that extends at least partially vertically in opposition to the air as the sail member rotates to generate an air flow for agitation of the vegetation.

* * * * *